US011455800B2

(12) United States Patent
Bauchot et al.

(10) Patent No.: US 11,455,800 B2
(45) Date of Patent: Sep. 27, 2022

(54) ROADWAY ALERT SYSTEM USING VIDEO STREAM FROM A SMART MIRROR

(71) Applicant: International Business Machines Corporation, Armonk, NY (US)

(72) Inventors: Frederic Bauchot, la Tourraque (FR); Anthony Joseph Arcuri, Williamson, TX (US); Ana C. Biazetti, Cary, NC (US); Erik Dean Anderson, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 376 days.

(21) Appl. No.: 16/741,760

(22) Filed: Jan. 14, 2020

(65) Prior Publication Data

US 2021/0216775 A1    Jul. 15, 2021

(51) Int. Cl.
*G06V 20/40* (2022.01)
*G08G 1/01* (2006.01)
*G06N 20/00* (2019.01)
*G06N 5/04* (2006.01)

(52) U.S. Cl.
CPC .............. *G06V 20/40* (2022.01); *G06N 5/04* (2013.01); *G06N 20/00* (2019.01); *G08G 1/0116* (2013.01); *G08G 1/0141* (2013.01); *G06V 20/44* (2022.01)

(58) Field of Classification Search
CPC ........ G06V 20/40; G06V 20/44; G06V 20/54; G06N 5/04; G06N 20/00; G08G 1/0116; G08G 1/0141; G08G 1/164; G08G 1/166; G08G 1/04
See application file for complete search history.

(56) References Cited

U.S. PATENT DOCUMENTS

| 10,661,795 | B1 * | 5/2020 | Li ........................... G08G 1/166 |
| 10,708,547 | B2 * | 7/2020 | Newman ............... G08G 1/0129 |
| 2002/0115423 | A1 | 8/2002 | Hatae et al. |
| 2015/0015712 | A1 * | 1/2015 | Sempuku ................ G06V 20/58 348/148 |
| 2017/0069090 | A1 * | 3/2017 | Okumura .............. G06T 3/4038 |
| 2017/0072853 | A1 * | 3/2017 | Matsuoka ............. B60W 40/10 |
| 2017/0131719 | A1 | 5/2017 | Micks et al. |
| 2018/0253973 | A1 * | 9/2018 | Yang ....................... G06V 20/58 |
| 2021/0042532 | A1 * | 2/2021 | Latapie ................... H04N 7/181 |
| 2021/0158697 | A1 * | 5/2021 | Schottland ............... G08G 1/08 |
| 2021/0276586 | A1 * | 9/2021 | Chen ...................... G08G 1/166 |

FOREIGN PATENT DOCUMENTS

WO    2018020604 A1    2/2018

* cited by examiner

*Primary Examiner* — Edward F Urban
*Assistant Examiner* — Wassim Mahrouka
(74) *Attorney, Agent, or Firm* — Jeffrey S LaBaw; Anthony V England; Randy E Tejeda

(57) ABSTRACT

In a method for smart roadway alerts, a roadway alert device, coupled to a vehicle: receives a video stream including a video of a location of a roadway from a video camera; decodes the video stream to extract a set of video frames; analyze the set of video frames to detect one or more risk events; generates a risk alert for each of the one or more risk events; and sends the risk alert to the vehicle.

20 Claims, 5 Drawing Sheets

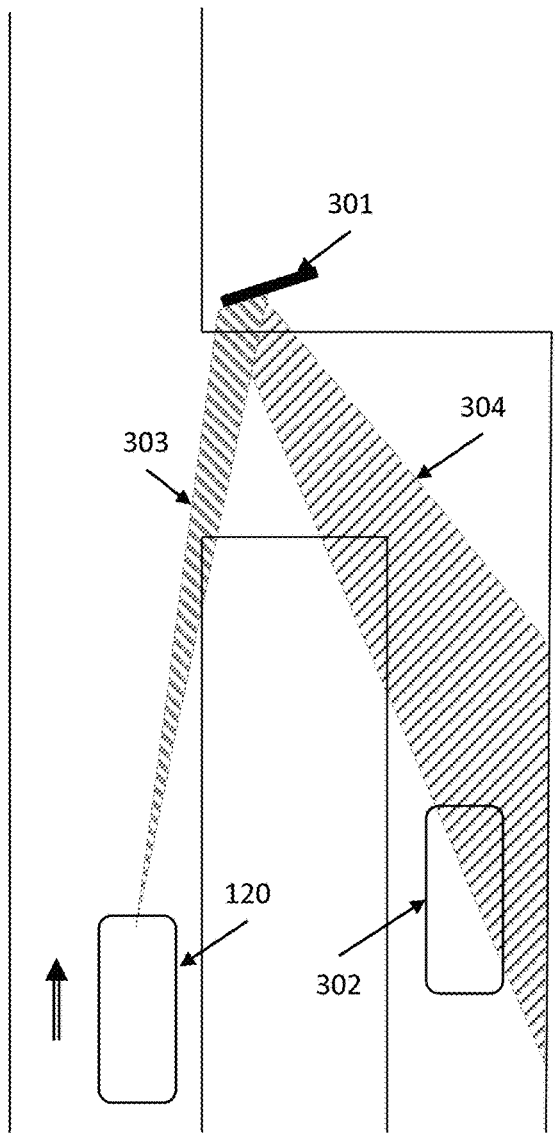 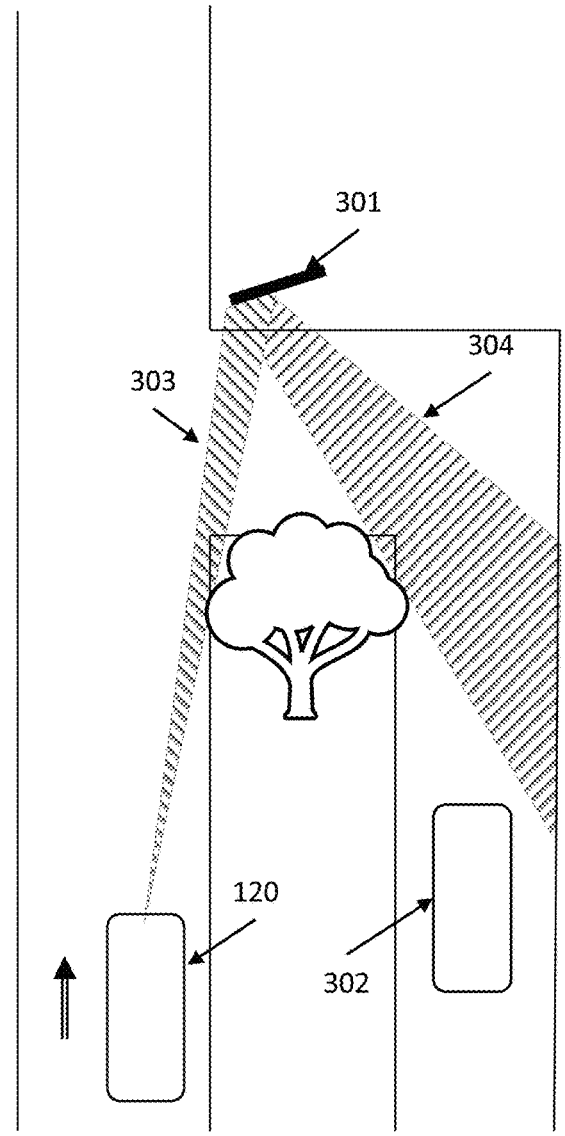
FIG. 3A Prior Art
FIG. 3B Prior Art

ROADWAY ALERT SYSTEM USING VIDEO STREAM FROM A SMART MIRROR

BACKGROUND

At some roadway intersections, a conventional mirror may be installed to aid a driver of a vehicle approaching an intersection in seeing other vehicles, bicycles, or pedestrians approaching or crossing the intersection at the same time. A conventional mirror may also be installed elsewhere proximate to the roadway to address vehicle or pedestrian safety, such as crosswalks not located in intersections.

SUMMARY

Disclosed herein is a method for smart roadway alerts and a computer program product and system as specified in the independent claims. Embodiments of the present invention are given in the dependent claims. Embodiments of the present invention can be freely combined with each other if they are not mutually exclusive.

According to an embodiment of the present invention, a method for smart roadway alerts includes: receiving, by a roadway alert device coupled to a vehicle, a video stream including a video of a location of a roadway from a video camera; decoding, by the roadway alert device, the video stream to extract a set of video frames; analyzing, by the roadway alert device, the set of video frames to detect one or more risk events; generating, by the roadway alert device, a risk alert for each of the one or more risk events; and sending, by the roadway alert device, the risk alert to the vehicle.

BRIEF DESCRIPTION OF THE DRAWINGS

FIGS. 3A and 3B illustrates conventional mirrors constrained by the requirement of dual visibility.

DETAILED DESCRIPTION

Figure 1:
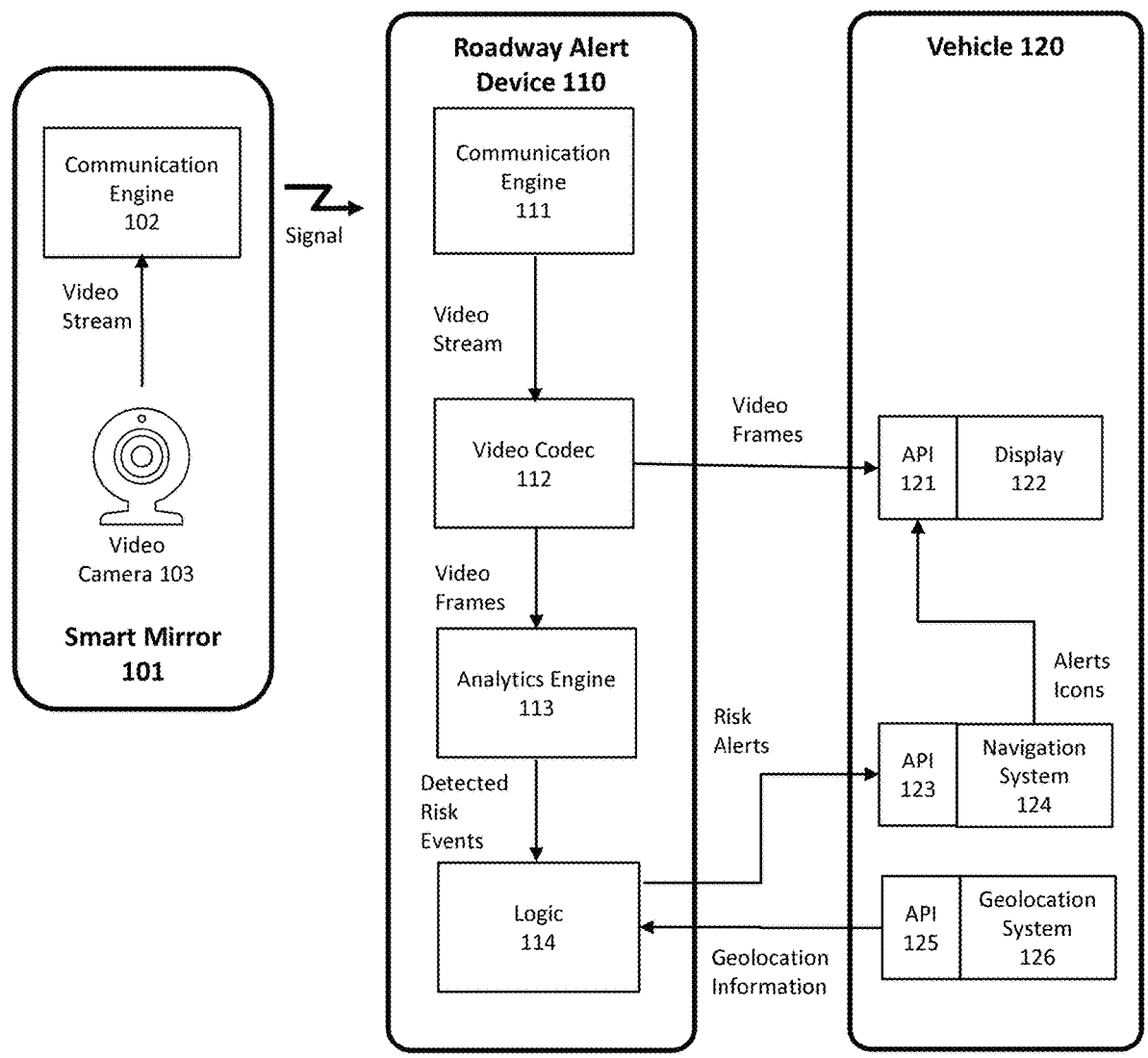
FIG. 1 illustrates a roadway alert system according to some exemplary embodiments of the present invention.

FIG. 1 illustrates a roadway alert system according to some exemplary embodiments of the present invention. The roadway alert system includes a "smart mirror" 101 affixed at a location proximate to a roadway. The smart mirror 101 includes a video camera 103 for capturing a video of the roadway according to its field of view. In an embodiment of the present invention, the video camera of the smart mirror may be placed at an intersection and aimed such as to provide a field of view that includes vehicles or pedestrians approaching an intersecting roadway. The smart mirror 101 further includes a communication engine 102 configured to broadcast a video stream of the video captured by the video camera 103. Any type of wireless communication medium may be used, such as Wi-Fi or 5G, and may be selected based on the desired range of the video stream. For example, the desired range is selected based on the average speed of travel of vehicles on a particular roadway, where the faster the average speed, the greater the desired range in order to give vehicle drivers sufficient time to react to any detected risk events. In some embodiments, the smart mirror 101 further includes one or more sensors, such as infrared sensors for night viewing, motion sensors, and sound sensors The roadway alert system further includes a roadway alert device 110. In some embodiments, the roadway alert device 110 is mounted or integrated with the other systems of the vehicle 120. In some embodiments, the roadway alert device 110 is a separate device (e.g. a smart phone), which is coupled to the vehicle 120 through a communication medium, such as Bluetooth™ or a cable. The roadway alert device 110 includes a communication engine 111 which can be configured to be in a listening state in order to detect and receive video streams from smart mirrors 101. In some embodiments, the smart mirror 101 continuously captures video and continuously broadcasts the video stream without considering whether any vehicles are within range. In other embodiments, the smart mirror 101 continuously captures and stores video but does not continuously broadcast the video stream. The roadway alert device 110 detects the presence of a nearby smart mirror 101 and requests the video stream. After conducting a handshake, the smart mirror 101 broadcasts the video stream that is then received by the roadway alert device 110. In some embodiments, the roadway alert device 110 receives the video stream directly from the smart mirror 101. In other embodiments, the smart mirror 101 sends the video stream to a server (not shown) over a network, and the roadway alert device 110 receives the video stream over the network.

The roadway alert device 110 further includes video codec 112 configured to decode the video stream and extract video frames, an analytics engine 113 configured to process the video frames to detect risk events, and a logic 114 configured to process the risk events and to generate risk alerts, as described further below. The roadway alert device 110 interfaces with other systems in the vehicle 120 via application programming interfaces (API) 121, 123, 125. In some embodiments, the video codec sends the video frames to a display 122 of the vehicle 120. In some embodiments, the logic 114 interfaces with the vehicle navigation system 124 and sends risk alerts to the navigation system 124. In some embodiments, the logic 114 is configured to interface with the vehicle geolocation system 126 to obtain the vehicle's geolocation information and configured to includes the geolocation information in the risk alerts.

Figure 2:
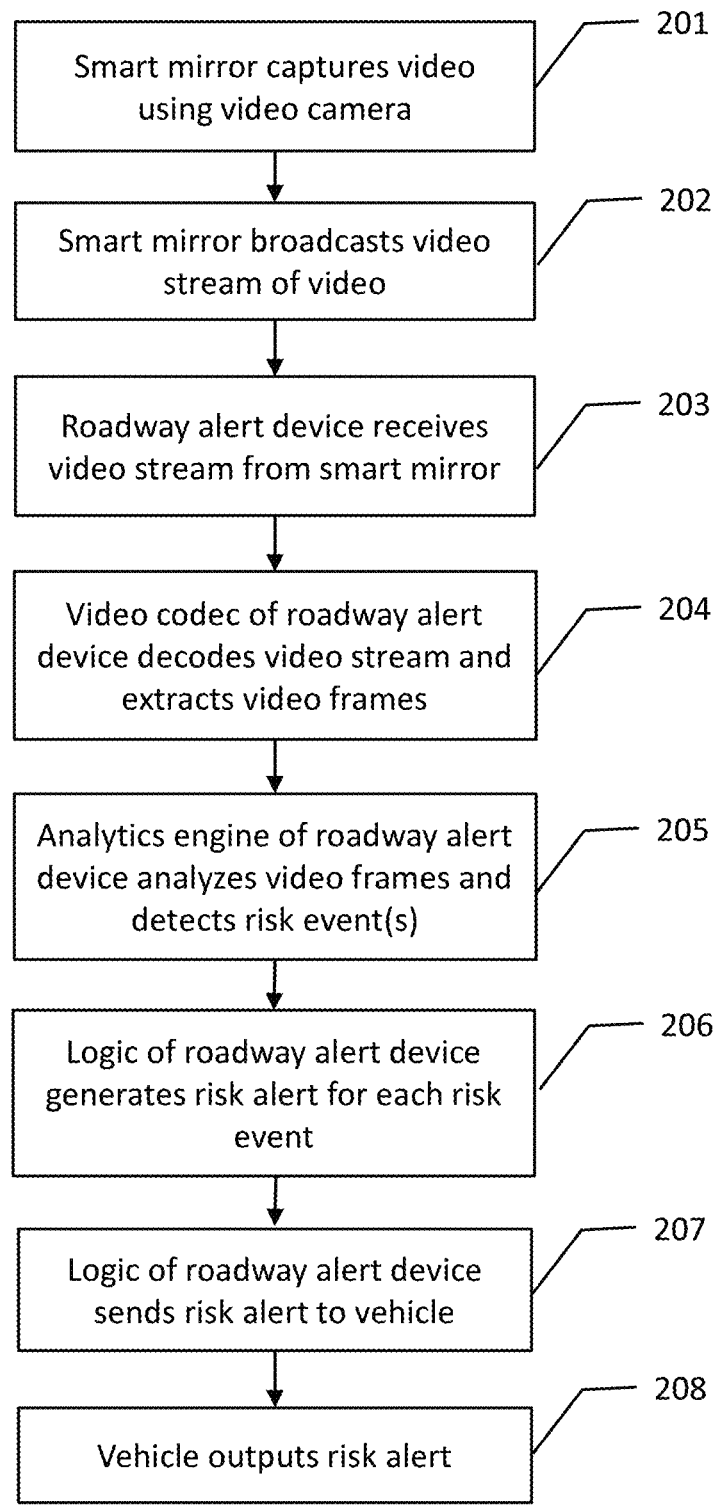
FIG. 2 illustrates a method for smart roadway alert according to some embodiments of the present invention.

FIG. 2 illustrates a method for smart roadway alert according to some embodiments of the present invention. Referring to both FIGS. 1 and 2, the smart mirror 101, affixed at a location with a field of view of a roadway, captures video of the roadway using the video camera 103 (201). The smart mirror 101, using the communication engine 102, broadcasts a video stream of the video (202). The roadway alert device 110 receives the video stream from the smart mirror 101 (203). The video codec 112 of the roadway alert device 110 decodes the video stream and extracts one or more video frames (204). The analytics engine 113 of the roadway alert device 110 analyzes the video frames to detect one or more risk events (205). In some embodiments, the analytics engine 113 is configured to perform object recognition of objects in the video frames. The object can include, but not limited to, an automobile, a bicycle, or a pedestrian. Using artificial intelligence, such as machine learning systems, the analytics engine 113 processes the information for the recognized objects and predicts a probability that a risk event exists. A risk event exists when the objects in the video frame poses a safety risk for the vehicle 120. A safety risk can include, but is not limited to, a projected collision between the vehicle 120 and an object or the object obstructing the projected path of the vehicle 120.

In some embodiment, the analytics engine 113 processes multiple video frames to calculate a speed and direction of motion of the object in the video frames. The analytics engine 113 also calculates the speed and direction of the vehicle 120 and uses both sets of data to determine the probability that the risk event exists. For example, the speeds and directions of the object and the vehicle 120 may indicate a potential of a collision.

In some embodiments, the analytics engine 113 detects multiple risk events in the same set of video frames. The analytics engine 113 can be configured to prioritize the risk events based on a number of parameters, such as object type and risk type. For example, the analytics engine 113 determines that a first risk event exists for a collision between the vehicle 120 and another vehicle on the roadway and a second risk event exists for a pedestrian waiting to cross the roadway. When the analytics engine 113 is configured with a higher priority for collisions, then the first risk event is given a higher priority than the second risk event. When the analytic engine 113 is configured with a higher priority for events involving pedestrians, the second risk event is given higher priority than the first risk event. For another example, the analytic engine 113 may be configured to prioritize risk events based on the order in which the risk events are projected to occur, with the earlier times given higher priority than the later times.

Referring again to FIG. 2, logic 114 of the roadway alert device 110 generates a risk alert for each detected risk event (206). The logic 114 sends the alert to the vehicle 120 (207), and the vehicle 120 outputs the risk alert (208). In some embodiments, the logic 114 generates the risk alert according to the risk event type (e.g. collision vs obstruction), the object type (e.g. risk event involves vehicle vs pedestrian), or some other pre-configured parameter. The risk alert can include a visual component, an audio component, or a combination of visual and audio components. In some embodiments, the logic 114 sends the risk alert to a navigation system 124 of the vehicle 120. The navigation system 124 generates an alert icon according to the risk alert, which is displayed as part of the navigation display. In some embodiments, an alert icon associated with the type of alert event is displayed on the navigation map on the display 122 or displayed on the vehicle dashboard. For example, the icon for a risk alert for a collision may be different than the icon for a risk alert for an obstruction. In some embodiments, the risk alert is sent to another system of the vehicle 120 which controls touch alerts, where the steering wheel is caused to vibrate. In some embodiments, the risk alert is sent to an audio system (not shown) of the vehicle 120, and an audible alert is output through speakers in the vehicle 120.

In some embodiments, the logic 114 is configured to interface with the geolocation system 126 of the vehicle 120 in order to obtain geolocation information for the vehicle 120. For example, when the geolocation system 126 includes a global positioning system (GPS), the logic 114 can obtain the GPS coordinates of the vehicle 120. The logic 114 includes the GPS coordinates in the risk alert, which is used by the vehicle 120 to provide a richer risk alert. In some embodiments, the smart mirror 101 includes a geolocation system (not shown), and the geolocation information of the smart mirror 101 is included in the metadata of the video stream. The logic 114 includes the geolocation information of the smart mirror 101 in the risk alert, which is then used by the vehicle 120 to provide the richer risk alert. The geolocation information in the risk alert can also be used by the navigation system 124 to more accurately place the alert icon on the displayed map.

In the above described manner, embodiments of the roadway alert system of the present invention removes the constraint of the "dual visibility" of conventional mirrors, i.e., simultaneous line of light between the vehicle driver and the mirror and the line of sight between the mirror and an object in the roadway. As illustrated in FIG. 3A, a line of sight 303 between the driver of the vehicle 120 and the conventional mirror 301, and a line of sight 304 between the mirror 301 and an object (e.g. another vehicle 302) in the roadway must exist simultaneously for object 302 to be visible to the driver of the vehicle 120. As illustrated in FIG. 3B, the line of sight 304 narrows when an obstruction, such as a tree, exists between the mirror 301 and the object 302. In this case, the obstruction is such that the object 302 is no longer visible to the driver of the vehicle 120.

Figure 4:
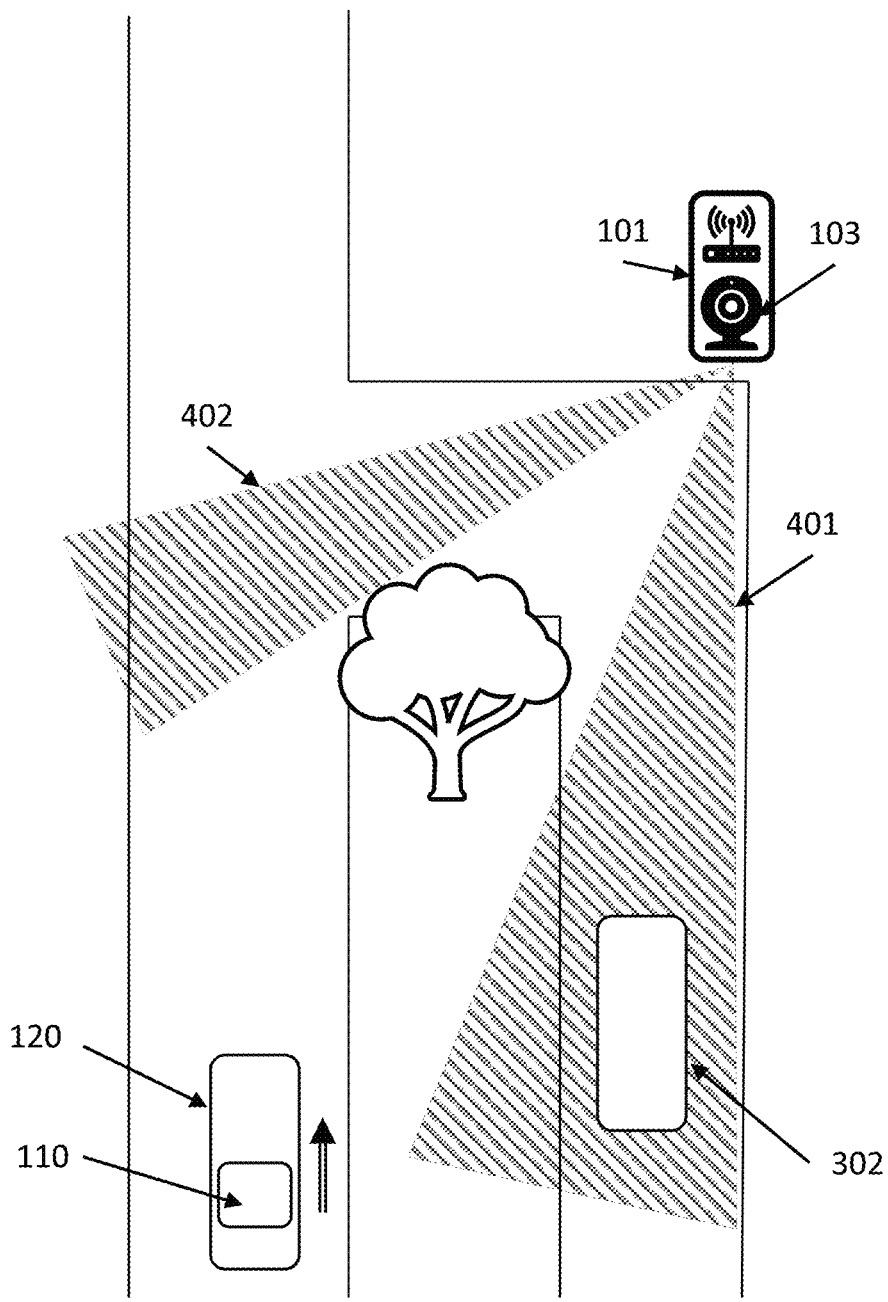
FIG. 4 illustrates an exemplary embodiment of the present invention not constrained by the requirement of dual visibility.

As illustrated in FIG. 4, the roadway alert system of the present invention is not constrained by the requirement of dual visibility. The smart mirror 101 is positioned at a location such that the field of view of the video camera 102 includes the roadway(s) of interest. When the video camera 103 has a line of sight 401 with the object 302, the captured video includes the object 302. In FIG. 4, the driver of the vehicle 120 has no line of light 402 with the smart mirror 101. Despite this, when the roadway alert system 110 is within range of the smart mirror 101 and receives the video stream, any risk alerts associated with the object 302 will be communicated to the driver. Thus, no line of light with the smart mirror 101 is required with the driver of the vehicle 120 for any risk event associated with the object 302 to be communicated to the vehicle driver.

In some embodiments, multiple smart mirrors 101 exist on the same roadway. Any number of smart mirrors can be affixed proximate to the same roadway. The fields of view for the multiple smart mirrors 101 can cover different parts of the roadway, and the fields of view can either overlap or be configured to not overlap. Assuming the roadway alert device 110 is within range of more than one of the smart mirrors 101, the communication engine 111 receives multiple video streams. The video codec 112, analytics engine 113, and logic 114 process the video stream, detect risk events, and generate risk alerts for each video stream in the manner described above. In some embodiments, the analytics engine 113 is configured to prioritize the risk events detected from multiple video streams based on a number of parameters, such as object type and risk type, in the same manner as described above. For example, the analytics engine 113 detects a first risk event for a first video stream from a first smart mirror, involving a vehicle traveling toward an intersection along a first street. The analytics engine 113 also detects a second risk event for a second video stream from a second smart mirror, involving a pedestrian on a second street near the intersection. When the analytics engine 113 is configured to give a higher priority to risk events related to vehicles, the first risk event is given a higher priority than the second risk event.

Figure 5:
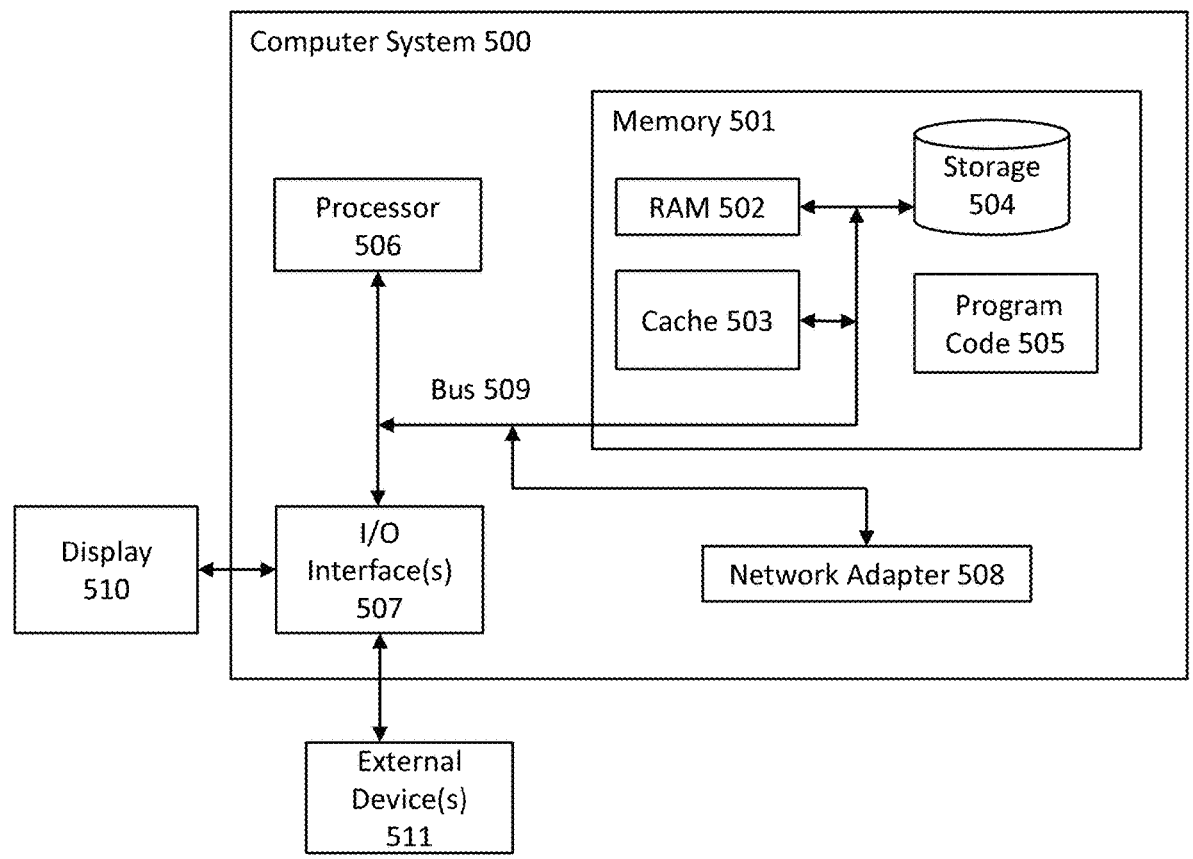
FIG. 5 illustrates a computer system, one or more of which implements the smart roadway alert system according to embodiments of the present invention.

FIG. 5 illustrates a computer system, one or more of which implements the smart roadway alert system according to embodiments of the present invention. The computer system 500 is operationally coupled to a processor or processing units 506, a memory 501, and a bus 509 that couples various system components, including the memory 501 to the processor 506. The bus 509 represents one or more of any of several types of bus structure, including a memory bus or memory controller, a peripheral bus, an accelerated graphics port, and a processor or local bus using any of a variety of bus architectures. The memory 501 may include computer readable media in the form of volatile memory, such as random access memory (RAM) 502 or cache memory 503, or non-volatile storage media 504. The memory 501 may include at least one program product having a set of at least one program code module 505 that are configured to carry out the functions of embodiment of the present invention when executed by the processor 506. The computer system 500 may also communicate with one or more external devices 511, such as a display 510, via I/O interfaces 507. The computer system 500 may communicate with one or more networks via network adapter 508.

The area viewable using a conventional mirror is limited to the mirror's field of view of the roadway and requires dual line of sight, a line of sight between the driver's eyes and the conventional mirror and a line of sight between the conventional mirror and an object proximate to roadway. When an obstruction exists to prevent either line of sight, the ability of the conventional mirror to alert drivers of events that pose a safety risk is reduced. In contrast to the use of conventional mirrors, embodiments of the roadway alert system of the present invention removes the constraint of the "dual visibility", where simultaneous line of light between the vehicle driver and the video camera and the line of sight between the video camera and an object in the roadway are not required for objects proximate to the roadway to be visible to the vehicle driver. According to an embodiment of the present invention, a smart mirror is affixed at a location proximate to a roadway. The smart mirror includes a video camera configured to capture a video of the roadway. The smart mirror broadcasts a video stream including the video. A roadway alert device, coupled to a vehicle receives the video stream from the smart mirror, decodes the video stream to extract a set of video frames, analyzes the set of video frames to detect one or more risk events, generates a risk alert for each of the one or more risk events, and sends the risk alert to the vehicle. The vehicle outputs the risk alert to the driver. A risk event exists when the object in the set of video frames poses a safety risk for the vehicle. The roadway alert device does need to have a line of sight with the smart mirror. In one aspect, the roadway alert device performs an object recognition of an object in the set of video frames. Using a machine learning system, the roadway alert device processes the information for the object and predicts a probability that the one or more risk events exist for the object in the set of video frames.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for smart roadway alerts, comprising:
   detecting a presence of a video camera of a smart mirror by a roadway alert device at a first time, the roadway alert device coupled to a vehicle and comprising a communications engine, a video codec and an analytics engine, the video camera external to the vehicle;
   receiving, by the communications engine of the roadway alert device, a video stream comprising a video of a location of a roadway from the video camera, wherein the smart mirror is located such that at the first time the vehicle is not visible in a field of view of the video camera and at a second time the vehicle is visible in the field of view of the video camera;
   decoding, by the video codec of the roadway alert device, the video stream to extract a set of video frames;
   analyzing, by the analytics engine of the roadway alert device, the set of video frames to detect one or more risk events;
   generating, by the analytics engine of the roadway alert device, a risk alert for each of the one or more risk events; and
   sending, by the roadway alert device, the risk alert to the vehicle.

2. The method of claim 1, wherein the analyzing of the set of video frames to detect the one or more risk events comprises:
   performing, by the analytics engine of the roadway alert device, an object recognition of an object in the set of video frames;
   using a machine learning system of the roadway alert device, processing, by the roadway alert device, information for the object; and
   predicting, by the roadway alert device using the machine learning system, a probability that the one or more risk events exist for the object in the set of video frames.

3. The method of claim 2, wherein a risk event exists when the object in the set of video frames poses a safety risk for the vehicle.

4. The method of claim 2, wherein the analyzing of the set of video frames to detect the one or more risk events further comprises:
   calculating, by the roadway alert device, a first speed and a first direction of motion of the object using the set of video frames;
   calculating, by the roadway alert device, a second speed and a second direction of motion of the vehicle; and
   predicting, by the roadway alert device, the probability that the one or more risk events exist for the object and the vehicle based on the first speed, the first direction, the second speed, and the second direction.

5. The method of claim 1, wherein the analyzing of the set of video frames to detect the one or more risk events comprises:
   detecting, by the roadway alert device, a plurality of risk events from the set of video frames; and
   prioritizing, by the roadway alert device, the plurality of risk events based on a set of preconfigured parameters.

6. The method of claim 1, further comprising:
   detecting a presence of a second video camera by the roadway alert device, the second video camera external to the vehicle;
   receiving, by the communications engine of the roadway alert device, a second video stream comprising a second video of a second location of the roadway from a second video camera;
   decoding, by the video codec of the roadway alert device, the second video stream to extract a second set of video frames;
   analyzing, by the analytics engine of the roadway alert device, the second set of video frames to detect one or more second risk events;
   prioritizing, by the roadway alert device, the one or more risk events and the one or more second risk events based on a set of preconfigured parameters;
   generating, by the roadway alert device, a second risk alert for each of the one or more second risk events; and sending, by the roadway alert device, the second risk alert to the vehicle.

7. A computer program product for smart roadway alerts for a roadway alert device, the roadway alert device coupled to a vehicle and comprising one or more processors, a communications engine, a video codec and an analytics engine, the computer program product comprising one or more computer readable storage media, and program instructions collectively stored on the one or more computer readable storage media, the program instructions executable by the one or more processors to cause the one or more processors to:

detect a presence of a video camera of a smart mirror by the roadway alert device at a first time, the video camera external to the vehicle;

receive, by the communications engine of the roadway alert device, a video stream comprising a video of a location of a roadway from the video camera, wherein the smart mirror is located such that at the first time the vehicle is not visible in a field of view of the video camera and at a second time the vehicle is visible in the field of view of the video camera;

decode, by the video codec of the roadway alert device, the video stream to extract a set of video frames;

analyze, by the analytics engine of the roadway alert device, the set of video frames to detect one or more risk events;

generate a risk alert for each of the one or more risk events; and send the risk alert to a vehicle.

8. The computer program product of claim 7, wherein in analyzing the set of video frames to detect the one or more risk events, the one or more processors are caused to:

perform, by the analytics engine of the roadway alert device, an object recognition of an object in the set of video frames;

using a machine learning system of the roadway alert device, process information for the object; and predict, using the machine learning system, a probability that the one or more risk events exist for the object in the set of video frames.

9. The computer program product of claim 8, wherein a risk event exists when the object in the set of video frames poses a safety risk for the vehicle.

10. The computer program product of claim 8, wherein in analyzing the set of video frames to detect the one or more risk events, the one or more processors are further caused to:

calculate a first speed and a first direction of motion of the object using the set of video frames;

calculate a second speed and a second direction of motion of the vehicle; and predict the probability that the one or more risk events exist for the object and the vehicle based on the first speed, the first direction, the second speed, and the second direction.

11. The computer program product of claim 7, wherein in analyzing the set of video frames to detect the one or more risk events, the one or more processors are caused to:

detect a plurality of risk events from the set of video frames; and prioritize the plurality of risk events based on a set of preconfigured parameters.

12. The computer program product of claim 7, wherein the one or more processors are further caused to:

receive a second video stream comprising a second video of a second location of the roadway from a second video camera;

decode the second video stream to extract a second set of video frames;

analyze the second set of video frames to detect one or more second risk events;

prioritize the one or more risk events and the one or more second risk events based on a set of preconfigured parameters;

generate a second risk alert for each of the one or more second risk events; and send the second risk alert to the vehicle.

13. A system comprising:

a roadway alert device coupled to a vehicle, the roadway alert device comprising a communications engine, a video codec and an analytics engine, the roadway alert device for:

detecting a presence of a video camera at a first time, the video camera external to the vehicle and incorporated in a smart mirror, wherein the smart mirror is located such that at the first time the vehicle is not visible in a field of view of the video camera and at a second time the vehicle is visible in the field of view of the video camera;

receiving, by the communications engine, a video stream of a location of a roadway from the video camera;

decoding, by the video codec, the video stream to extract a set of video frames;

analyzing, by the analytics engine, the set of video frames to detect one or more risk events;

generating a risk alert for each of the one or more risk events; and sending the risk alert to the vehicle.

14. The system of claim 13, wherein the analyzing of the set of video frames to detect the one or more risk events comprises:

performing, by the analytics engine, an object recognition of an object in the set of video frames;

using a machine learning system of the roadway alert device, processing information for the object; and predicting, using the machine learning system, a probability that the one or more risk events exist for the object in the set of video frames.

15. The system of claim 14, wherein a risk event exists when the object in the set of video frames poses a safety risk for the vehicle.

16. The system of claim 13, wherein the analyzing of the set of video frames to detect the one or more risk events comprises:

detecting a plurality of risk events from the set of video frames; and prioritizing the plurality of risk events based on a set of preconfigured parameters.

17. The system of claim 13, wherein the roadway alert device is further for:

receiving a second video stream of a second location of the roadway from second video camera;

decoding the second video stream to extract a second set of video frames;

analyzing the second set of video frames to detect one or more second risk events;

prioritizing the one or more risk events and the one or more second risk events based on a set of preconfigured parameters;

generating a second risk alert for each of the one or more second risk events; and sending the second risk alert to the vehicle.

18. The method of claim 1, wherein the detecting further comprises:

configuring the communications engine to be in a listening state; and responsive to detecting a video stream from a smart mirror, detecting the presence of the video camera.

19. The method of claim 1, wherein the detecting further comprises performing a handshake with a detected smart mirror as part of a request for a video stream; and wherein the receiving further comprises receiving the video stream directly from the smart mirror.

20. The method of claim 1, further comprising:

interfacing, by the roadway alert device, with a geolocation system in the vehicle to obtain vehicle geolocation information; and interfacing, by the roadway alert device, with a navigation system in the vehicle to send the risk alert to the navigation system in the vehicle, wherein the risk alert is based on the vehicle geolocation information.

* * * * *